(12) United States Patent
Hiyoshi

(10) Patent No.: US 11,754,588 B2
(45) Date of Patent: Sep. 12, 2023

(54) INERTIAL SENSOR DEVICE AND INERTIAL MEASUREMENT UNIT

(71) Applicant: SEIKO EPSON CORPORATION, Tokyo (JP)

(72) Inventor: Yasunori Hiyoshi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/407,749

(22) Filed: Aug. 20, 2021

(65) Prior Publication Data
US 2022/0057426 A1    Feb. 24, 2022

(30) Foreign Application Priority Data

Aug. 24, 2020   (JP) .................. 2020-140704

(51) Int. Cl.
  *G01P 15/08*   (2006.01)
  *G01P 1/00*    (2006.01)
  *G01P 1/02*    (2006.01)
(52) U.S. Cl.
  CPC .......... *G01P 15/0802* (2013.01); *G01P 1/023* (2013.01); *G01P 1/06* (2013.01)

(58) Field of Classification Search
  CPC ..................................... G01P 15/802
  See application file for complete search history.

(56) References Cited

U.S. PATENT DOCUMENTS

2005/0150289 A1   7/2005   Osborne
2021/0215483 A1*  7/2021   Krone ............... G01S 19/49

FOREIGN PATENT DOCUMENTS

| JP | 2000-187042 | 7/2000 |
| JP | 2009-031032 | 2/2009 |
| JP | 5445270 | 3/2014 |
| JP | 2019-060689 | 4/2019 |
| WO | 2018/012165 A1 | 1/2018 |

* cited by examiner

*Primary Examiner* — Walter L Lindsay, Jr.
*Assistant Examiner* — Andrew V Do
(74) *Attorney, Agent, or Firm* — Rankin, Hill & Clark LLP

(57) ABSTRACT

An inertial sensor device includes a plurality of inertial measurement units, one of the inertial measurement units includes an inertial sensor, a reception section configured to receive data of another of the inertial measurement units, a combination processing section configured to operate the data of the another of the inertial measurement units and data of the one of the inertial measurement units, and a first transmission section configured to transmit output of the combination processing section.

4 Claims, 9 Drawing Sheets

INERTIAL SENSOR DEVICE AND INERTIAL MEASUREMENT UNIT

The present application is based on, and claims priority from JP Application Serial Number 2020-140704, filed Aug. 24, 2020, the disclosure of which is hereby incorporated by reference herein in its entirety.

BACKGROUND

1. Technical Field

The present disclosure relates to an inertial sensor and an inertial measurement unit.

2. Related Art

In recent years, an inertial sensor manufactured using an MEMS (Micro Electro Mechanical Systems) technology has been developed as an electronic device. Such an inertial sensor is not sufficient in an S/N ratio of an output signal, and is therefore difficult to be applied to equipment or a system which is required to perform measurement of high precision.

In JP-A-2019-60689 (Document 1), there is disclosed a physical quantity detection device which generates a physical quantity signal having a noise component the level of which is low in inverse proportion to a square root of the number of physical quantity detection elements without using an adder circuit by electrically coupling detection electrodes of the physical quantity detection elements to a physical quantity detection circuit to input a detection signal obtained by adding signals output from the detection electrodes of the respective physical quantity detection elements to each other to the physical quantity detection circuit.

However, in the technology described in Document 1, a signal processing circuit and an arithmetic processing circuit are required in addition to the physical quantity detection device in order to perform correction processing on an angular velocity signal and an acceleration signal respectively output from an angular velocity detection device and an acceleration detection device as physical quantity detection devices, and to control a detection operation of each of the angular velocity detection device and the acceleration detection device, and therefore, there is a problem that it is difficult to achieve reduction is size of the inertial measurement device.

SUMMARY

An inertial sensor device is an inertial sensor device including a plurality of inertial measurement units, one of the inertial measurement units includes an inertial sensor, a reception section configured to receive data of another of the inertial measurement units, a combination processing section configured to operate the data of the another of the inertial measurement units and data of the one of the inertial measurement units, and a first transmission section configured to transmit output of the combination processing section.

An inertial measurement unit is an inertial measurement unit to be used in an inertial sensor device having a plurality of inertial measurement units, including an inertial sensor, a reception section configured to receive data of another of the inertial measurement units, a combination processing section configured to operate the data of the another of the inertial measurement units and data of the inertial measurement unit, and a first transmission section configured to transmit output of the combination processing section.

DESCRIPTION OF EXEMPLARY EMBODIMENTS

1. Embodiment 1

Figure 1:
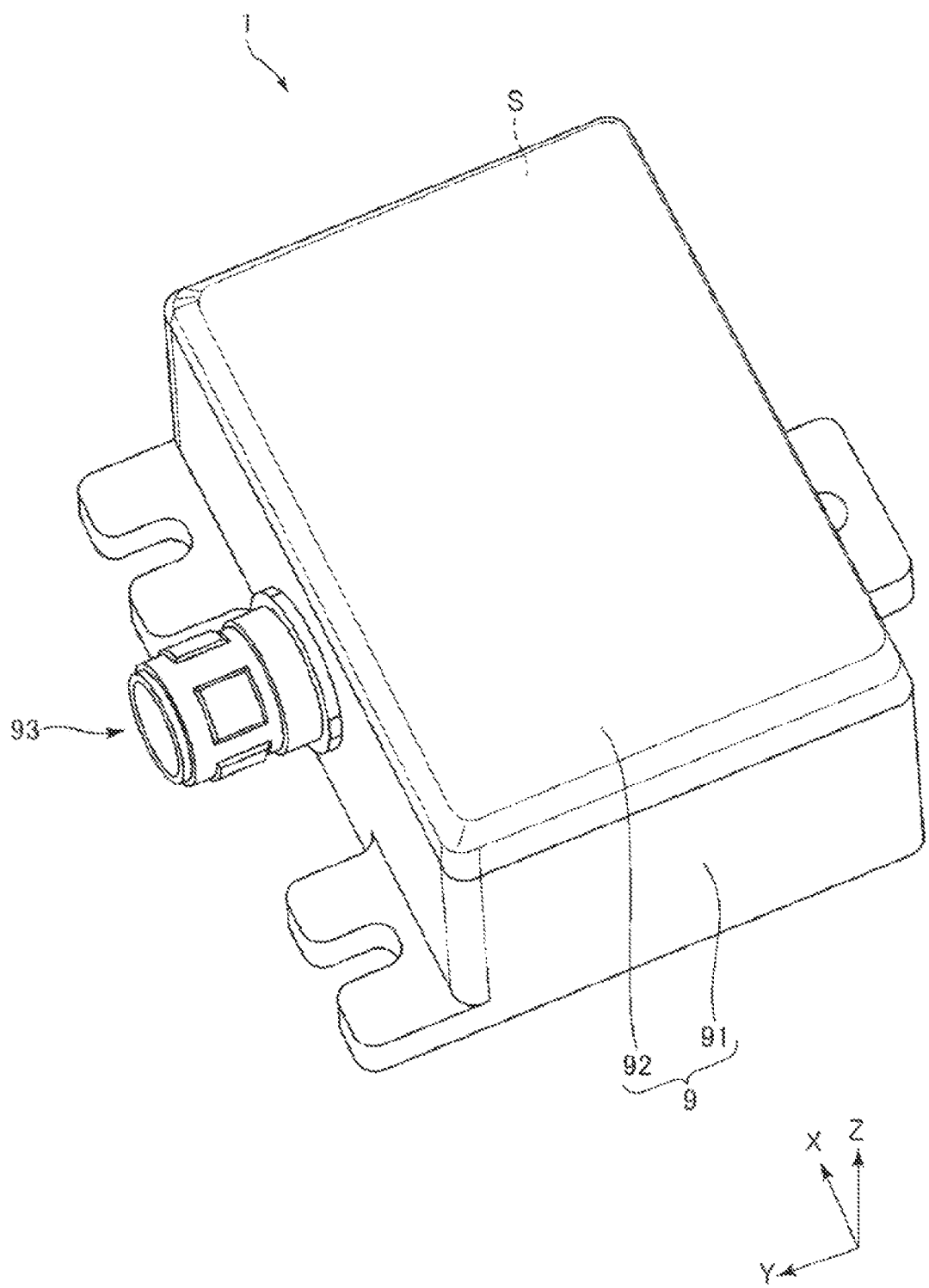
FIG. 1 is a perspective view of an inertial sensor device according to Embodiment 1.

A schematic configuration of an inertial sensor device 1 according to Embodiment 1 will be described with reference to FIG. 1 through FIG. 3. It should be noted that in FIG. 2, illustration of a lid 92 is omitted for the sake of convenience of explanation. Further, in FIG. 2 and FIG. 3, illustration of interconnections, terminals, and so on is omitted for the sake of convenience of explanation. Further, in the drawings, the dimensional ratios between the constituents are different from actual ones.

In the coordinate attached to the drawings, the three axes perpendicular to each other are described as an X axis, a Y axis, and a Z axis. A direction along the X axis is referred to as an "X direction," a direction along the Y axis is referred to as a "Y direction," and a direction along the Z axis is referred to as a "Z direction," and an arrow direction corresponds to a positive direction. Further, the description will be presented assuming the positive direction in the Z direction as an "upper side" or "above," and the negative direction in the Z direction as a "lower side" or "below." Further, in a plan view when viewed from the Z direction, the description will be presented assuming that a surface at the positive side in the Z direction as an upper surface, and a surface at the negative side in the Z direction which is an opposite side to the upper surface as a lower surface.

Figure 2:
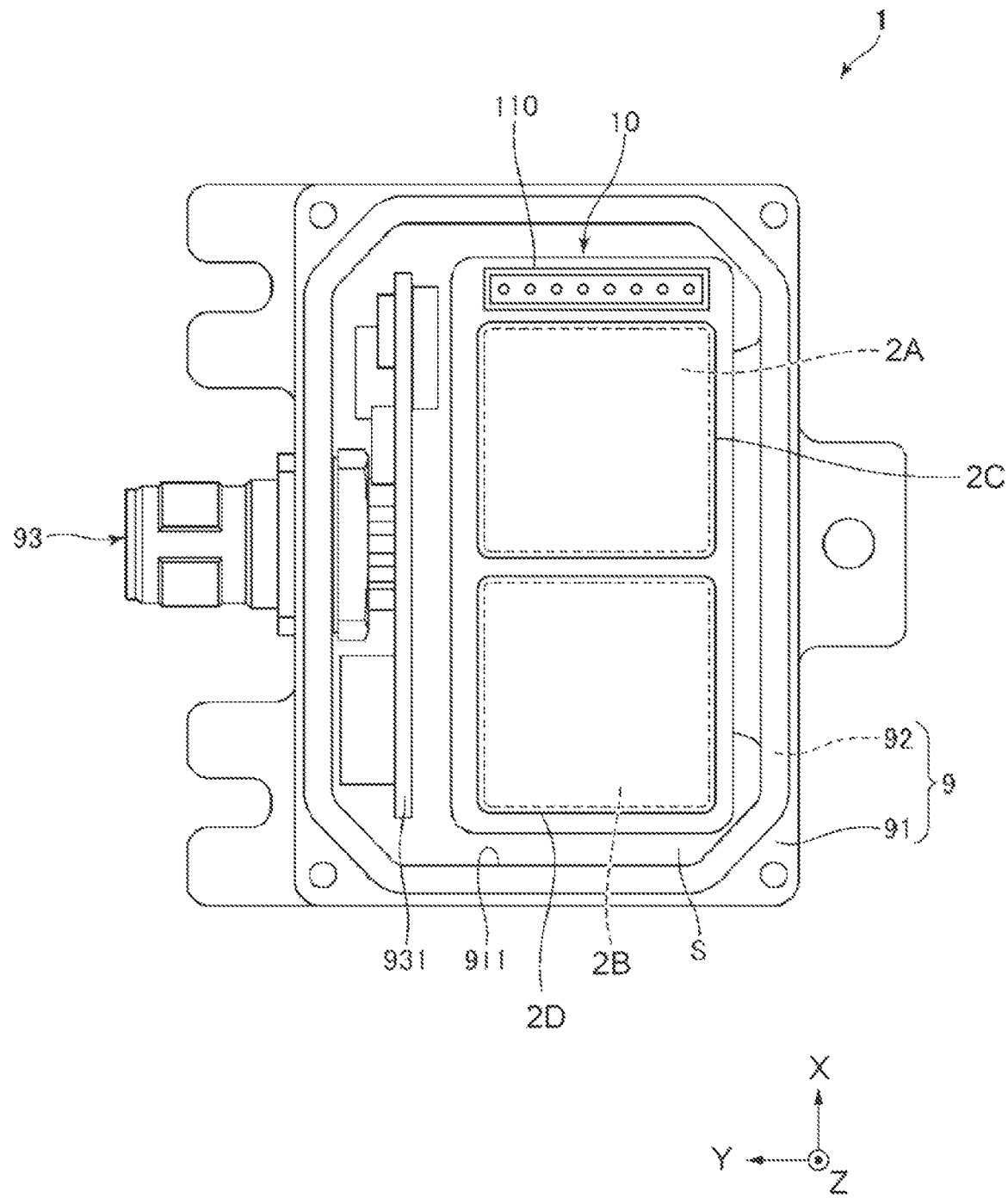
FIG. 2 is a plan view showing an inside of the inertial sensor device according to Embodiment 1.
Figure 3:
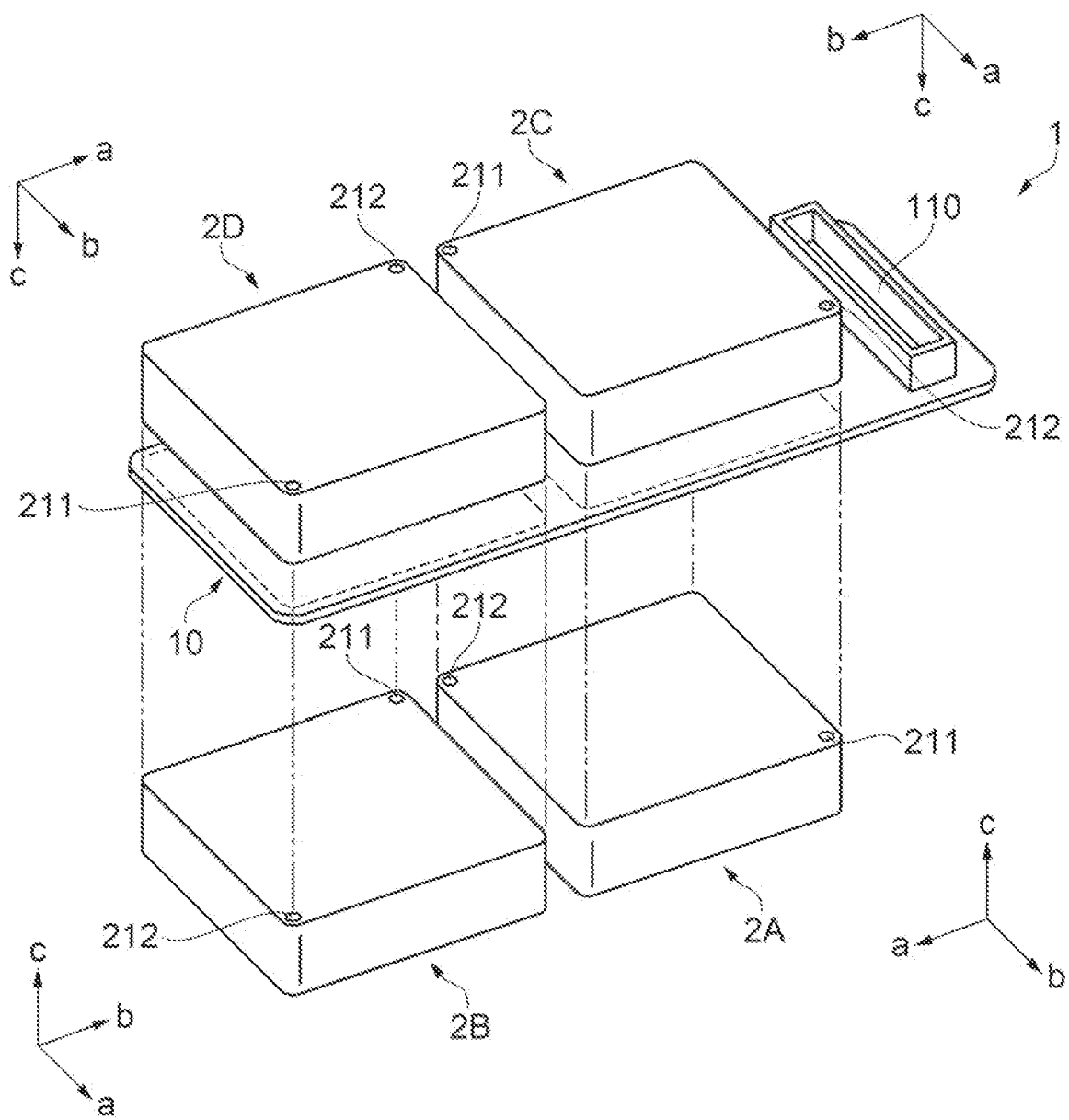
FIG. 3 is an exploded perspective view of a substrate and an inertial measurement unit of the inertial sensor device according to Embodiment 1.

As shown in FIG. 1 through FIG. 3, the inertial sensor device 1 is provided with a substrate 10, a first inertial measurement unit 2A, a second inertial measurement unit 2B, a third inertial measurement unit 2C, and a fourth inertial measurement unit 2D mounted on the substrate 10, a container 9, a connector 93, a communication board 931, and an internal connector 110.

As shown in FIG. 1 and FIG. 2, the container 9 is provided with a base 91 having a recessed part 911 recessed downward, and a lid 92 fixed to the base 91 so as to close the recessed part 911. The container 9 has a rectangular solid shape as a whole. The base 91 and the lid 92 form a housing space S inside the recessed part 911 to be sealed by the lid 92. The housing space S is a space for housing components such as the substrate 10, the first inertial measurement unit 2A, the second inertial measurement unit 2B, the third inertial measurement unit 2C, the fourth inertial measurement unit 2D, the communication board 931, and the internal connector 110.

The connector 93 is attached to a sidewall of the base 91. The connector 93 is a receptacle for making electrical contact between an inside and an outside of the container 9. The communication board 931 has a circuit for processing the communication between the inertial sensor device 1 and other devices. The connector 93 and the communication board 931 are electrically coupled to each other via interconnections which are not shown and are provided to the communication board 931. Further, the communication board 931 and the substrate 10 are electrically coupled to each other via the internal connector 110 provided to the substrate 10 and cable wiring not shown.

On the substrate 10, there are mounted the first inertial measurement unit 2A, the second inertial measurement unit 2B, the third inertial measurement unit 2C, the fourth inertial measurement unit 2D, the internal connector 110, and so on.

As shown in FIG. 2 and FIG. 3, the first inertial measurement unit 2A and the second inertial measurement unit 2B are arranged along the X direction on the lower surface of the substrate 10. The third inertial measurement unit 2C, the fourth inertial measurement unit 2D, and the internal connector 110 are arranged along the X direction on the upper surface of the substrate 10.

Further, in a portion of the substrate 10 where the first inertial measurement unit 2A is disposed, there are disposed connectors which are not shown, and are electrically coupled respectively to a first unit connector 25a and a second unit connector 25b described later and provided to the first inertial measurement unit 2A. The first inertial measurement unit 2A is electrically coupled to the internal connector 110, the second inertial measurement unit 2B, the third inertial measurement unit 2C, and the fourth inertial measurement unit 2D via connectors and interconnections which are not shown and are provided to the substrate 10.

Similarly, in portions of the substrate 10 where the second inertial measurement unit 2B, the third inertial measurement unit 2C, and the fourth inertial measurement unit 2D are respectively disposed, there are disposed connectors not shown and to electrically be coupled respectively to third unit connectors 25c respectively provided to the second inertial measurement unit 2B, the third inertial measurement unit 2C, and the fourth inertial measurement unit 2D. The second inertial measurement unit 2B, the third inertial measurement unit 2C, and the fourth inertial measurement unit 2D are electrically coupled to the first inertial measurement unit 2A via connectors and interconnections which are not shown and are provided to the substrate 10.

Then, the first inertial measurement unit 2A, the second inertial measurement unit 2B, the third inertial measurement unit 2C, and the fourth inertial measurement unit 2D will be described. It should be noted that the first inertial measurement unit 2A, the second inertial measurement unit 2B, the third inertial measurement unit 2C, and the fourth inertial measurement unit 2D have substantially the same configuration except some portions, and therefore, hereinafter the first inertial measurement unit 2A will be described first, and then, the second inertial measurement unit 2B, the third inertial measurement unit 2C, and the fourth inertial measurement unit 2D will be described focusing attention on the differences from the first inertial measurement unit 2A while omitting the description duplicating the description of the first inertial measurement unit 2A.

The first inertial measurement unit 2A will be described with reference to FIG. 4 through FIG. 6. It should be noted that in FIG. 4 through FIG. 6, illustration of interconnections, terminals, and so on is omitted for the sake of convenience of explanation.

Figure 4:
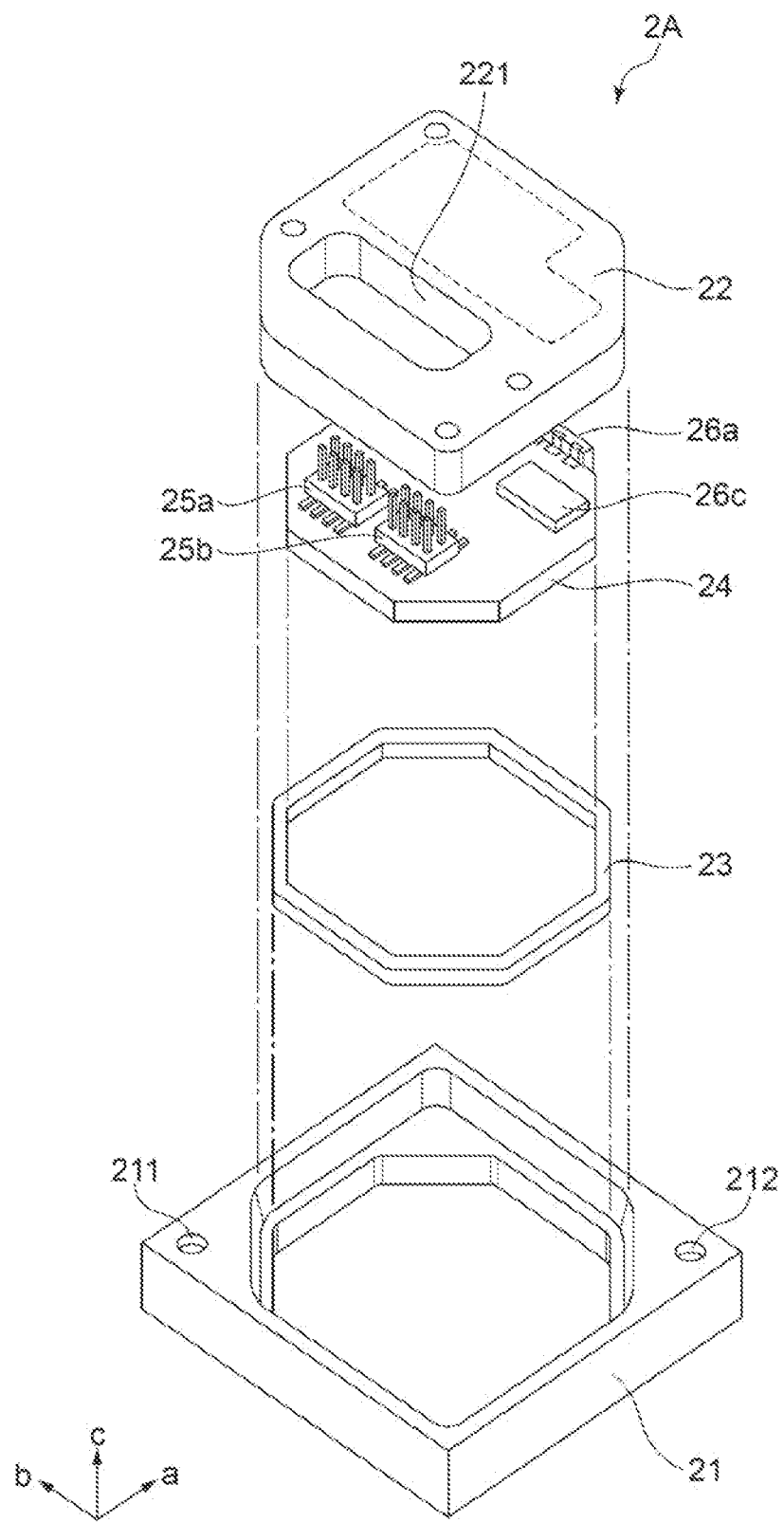
FIG. 4 is an exploded perspective view of a first inertial measurement unit according to Embodiment 1.
Figure 5:
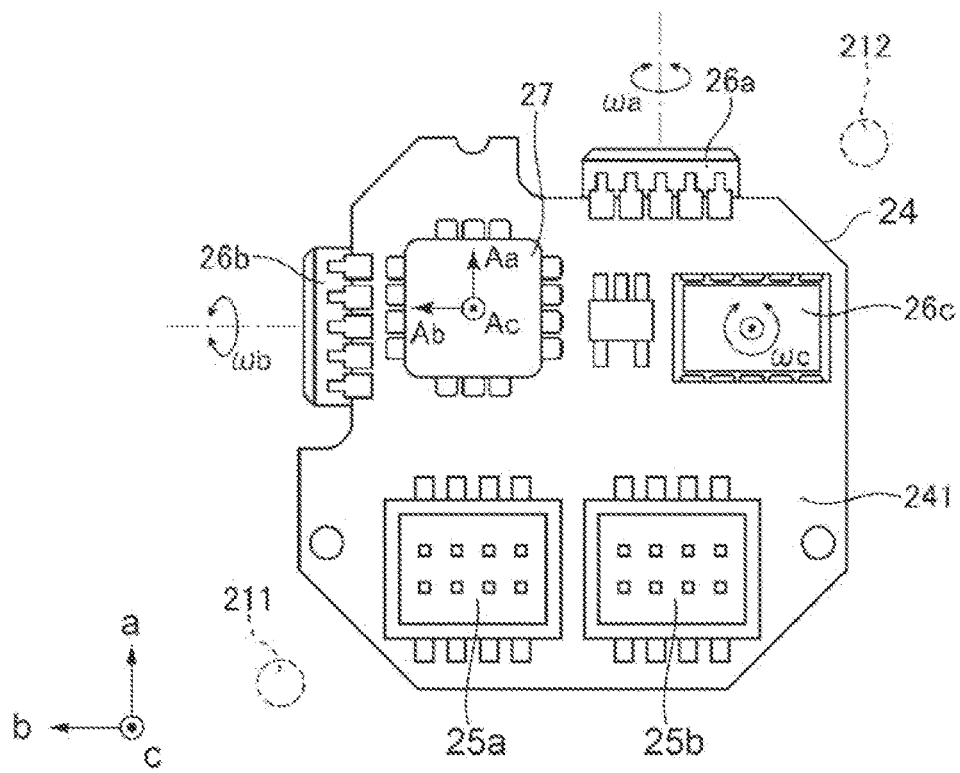
FIG. 5 is a top view of a circuit board provided to the first inertial measurement unit according to Embodiment 1.
Figure 6:
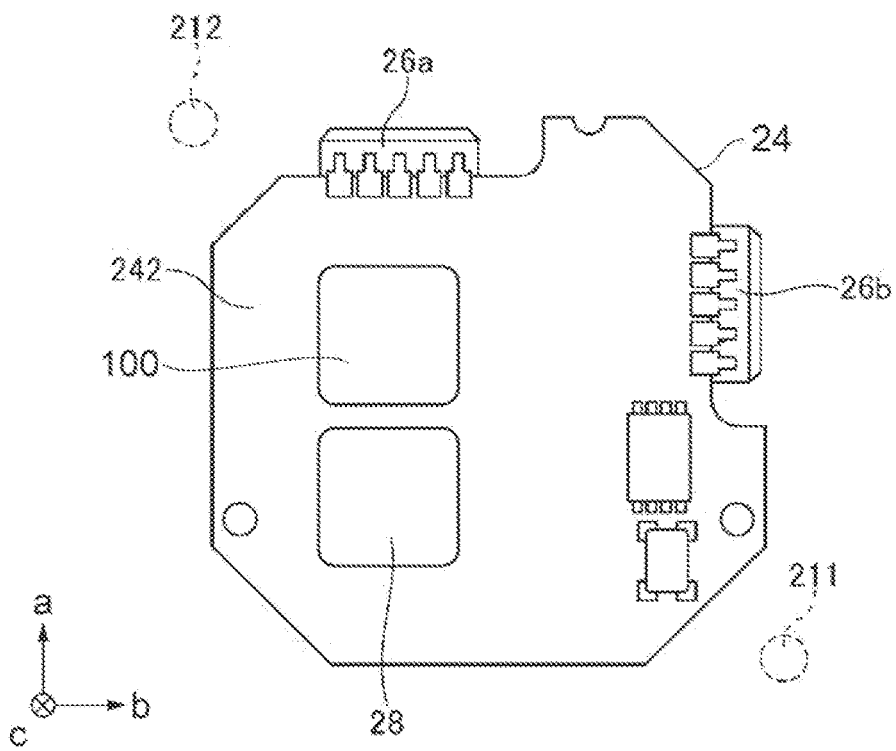
FIG. 6 is a bottom view of the circuit board provided to the first inertial measurement unit according to Embodiment 1.

In preparation for the description of the first inertial measurement unit 2A, an a axis, a b axis, and a c axis as three axes perpendicular to each other are illustrated in FIG. 4 through FIG. 6. The a axis, the b axis, and the c axis are axes defined as detection axes to be a reference of inertial measurement such as angular velocity and acceleration in each of the first inertial measurement unit 2A, the second inertial measurement unit 2B, the third inertial measurement unit 2C, and the fourth inertial measurement unit 2D, and are axes different from the X axis, the Y axis, and the Z axis as the axes set to the inertial sensor device 1. Further, a direction along the a axis is referred to as an "a direction," a direction along the b axis is referred to as a "b direction," and a direction along the c axis is referred to as a "c direction," and an arrow direction corresponds to a positive direction.

As shown in FIG. 4, the first inertial measurement unit 2A is provided with an outer case 21, an inner case 22, a bonding member 23, and a circuit board 24. The outer case 21 has a recessed part into which the inner case 22 is inserted. The outer case 21 and the inner case 22 are bonded to each other with the bonding member 23 in a state of housing and holding the circuit board 24. The first inertial measurement unit 2A has, for example, a square shape when viewed from the c direction. The outer case 21 has screw holes 211, 212 respectively disposed in, for example, a pair of corner parts located at diagonal positions on the upper surface. The first inertial measurement unit 2A is screwed using the screw holes 211, 212 to thereby be fixed to the substrate 10.

As shown in FIG. 5 and FIG. 6, on the circuit board 24, there are mounted the first unit connector 25a, the second unit connector 25b, a first angular velocity sensor 26a, a second angular velocity sensor 26b, a third angular velocity sensor 26c, an acceleration sensor 27, a unit control section 28, a master control section 100, and so on.

As shown in FIG. 5, the circuit board 24 has, for example, a square shape when viewed from the c direction. The first angular velocity sensor 26a is disposed on a side surface along the b axis and the c axis of the circuit board 24, and detects an angular velocity ωa around the a axis. The second angular velocity sensor 26b is disposed on a side surface along the a axis and the c axis of the circuit board 24, and detects an angular velocity ωb around the b axis. The third angular velocity sensor 26c is disposed on an upper surface 241 of the circuit board 24, and detects an angular velocity ωc around the c axis. The acceleration sensor 27 is disposed on the upper surface 241 of the circuit board 24, and detects the acceleration Aa in a direction along the a axis, the acceleration Ab in a direction along the b axis, and the acceleration Ac in a direction along the c axis.

As shown in FIG. 6, the unit control section 28 and the master control section 100 are disposed on a lower surface 242 of the circuit board 24. The first unit connector 25a and the second unit connector 25b each having two terminals, namely an input-side terminal and an output-side terminal, are disposed on the upper surface 241 of the circuit board 24, and are exposed to the substrate 10 via an opening 221 provided to the inner case 22.

The unit control section 28 is, for example, an MCU (Micro Controller Unit), and controls each section of the first inertial measurement unit 2A. The unit control section 28 is electrically coupled to each of the first angular velocity sensor 26a, the second angular velocity sensor 26b, the third angular velocity sensor 26c, and the acceleration sensor 27 via interconnection not shown and provided to the circuit board 24. Further, the unit control section 28 is electrically coupled to the master control section 100 via interconnections not shown and provided to the circuit board 24.

The master control section 100 is, for example, an MCU (Micro Controller Unit), and controls each section of the inertial sensor device 1. The master control section 100 is electrically coupled to the first unit connector 25a and the second unit connector 25b via interconnections not shown of the circuit board 24. It should be noted that although circuit elements such as MCU separated from each other are used as the unit control section 28 and the master control section 100 in the present embodiment, it is possible to incorporate both of the unit control section 28 and the master control section 100 in a common circuit element, and it does not matter that the unit control section 28 and the master control section 100 are incorporated in, for example, a single MCU.

The first unit connector 25a is coupled to the internal connector 110 via connectors and interconnections not shown and provided to the substrate 10. Further, the second unit connector 25b is coupled to the third unit connectors 25c described later and respectively provided to the second inertial measurement unit 2B, the third inertial measurement unit 2C, and the fourth inertial measurement unit 2D via connectors and interconnections which are not shown and are provided to the substrate 10. It should be noted that the configuration of the second unit connector 25b is set in accordance with a coupling configuration such as star type wiring or bus type wiring between the first inertial measurement unit 2A and the second inertial measurement unit 2B, the third inertial measurement unit 2C, and the fourth inertial measurement unit 2D.

Figure 7:
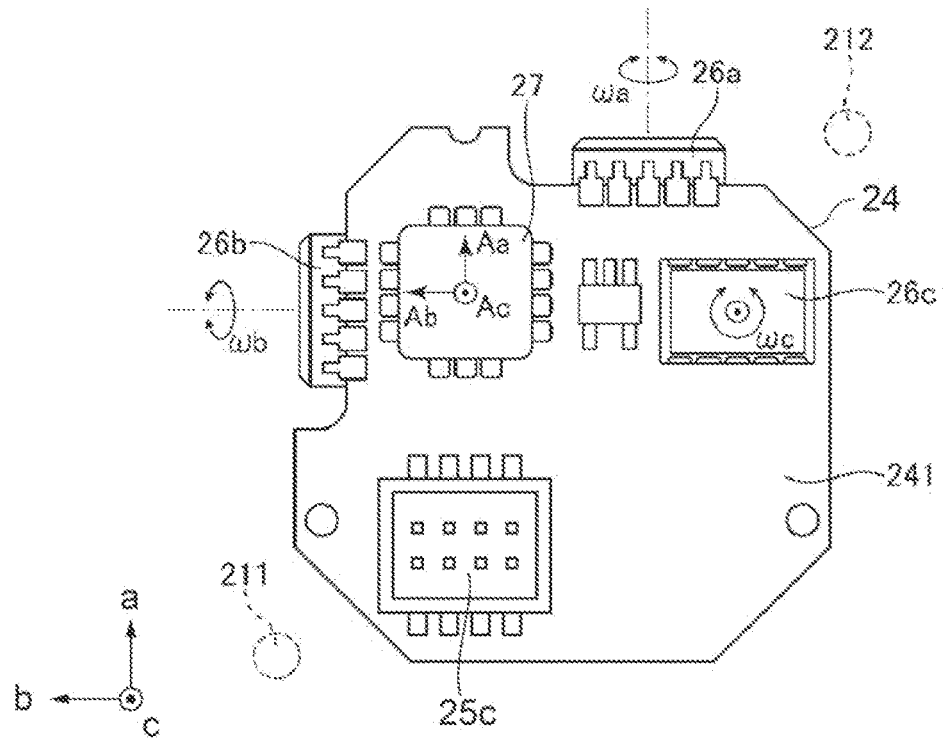
FIG. 7 is a top view of a circuit board provided to a second inertial measurement unit according to Embodiment 1.
Figure 8:
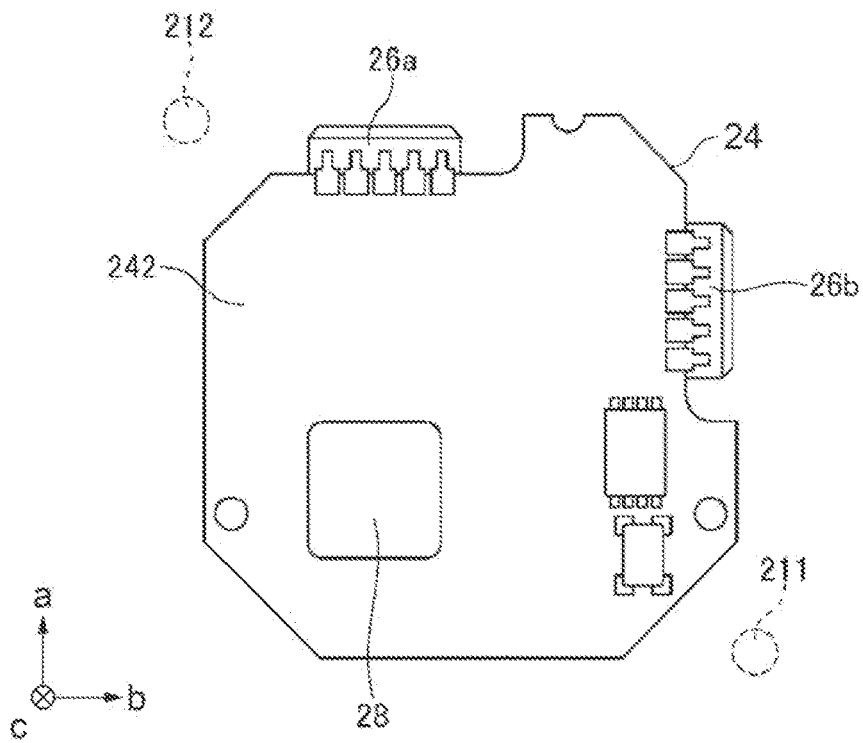
FIG. 8 is a bottom view of the circuit board provided to the second inertial measurement unit according to Embodiment 1.

Then, the second inertial measurement unit 2B, the third inertial measurement unit 2C, and the fourth inertial measurement unit 2D will be described with reference to FIG. 7 and FIG. 8. It should be noted that in FIG. 7 and FIG. 8, illustration of interconnections, terminals, and so on is omitted for the sake of convenience of explanation. Further, since the second inertial measurement unit 2B, the third inertial measurement unit 2C, and the fourth inertial measurement unit 2D are substantially the same in configuration, the description will be presented illustrating the second inertial measurement unit 2B, and the description of the third inertial measurement unit 2C and the fourth inertial measurement unit 2D will be omitted. It should be noted that although in the present embodiment, there are used the three inertial measurement units, namely the second inertial measurement unit 2B, the third inertial measurement unit 2C, and the fourth inertial measurement unit 2D, for example, as other inertial measurement units than the first inertial measurement unit 2A, but the number of the other inertial measurement units than the first inertial measurement unit 2A is not limited to three, and does not matter providing the number is one or more.

As shown in FIG. 7 and FIG. 8, unlike the first inertial measurement unit 2A, the second inertial measurement unit 2B does not have the master control section 100, the first unit connector 25a, and the second unit connector 25b. Further, as shown in FIG. 7 and FIG. 8, unlike the first inertial measurement unit 2A, the second inertial measurement unit 2B has the third unit connector 25c.

In the second inertial measurement unit 2B, the unit control section 28 is coupled to the third unit connector 25c via interconnections not shown and provided to the circuit board 24. Further, the third unit connector 25c is coupled to the second unit connector 25b of the first inertial measurement unit 2A via connectors and interconnections not shown and provided to the substrate 10.

Then, the coupling configuration between the first inertial measurement unit 2A and the second inertial measurement unit 2B, the third inertial measurement unit 2C, and the fourth inertial measurement unit 2D, and an electrical configuration in the inside of each of the inertial measurement units will be described with reference to FIG. 9. It should be noted that since the internal configurations of the third inertial measurement unit 2C and the fourth inertial measurement unit 2D are the same as the internal configuration of the second inertial measurement unit 2B, the illustration of the internal configurations of the third inertial measurement unit 2C and the fourth inertial measurement unit 2D is omitted in FIG. 9.

Figure 9:
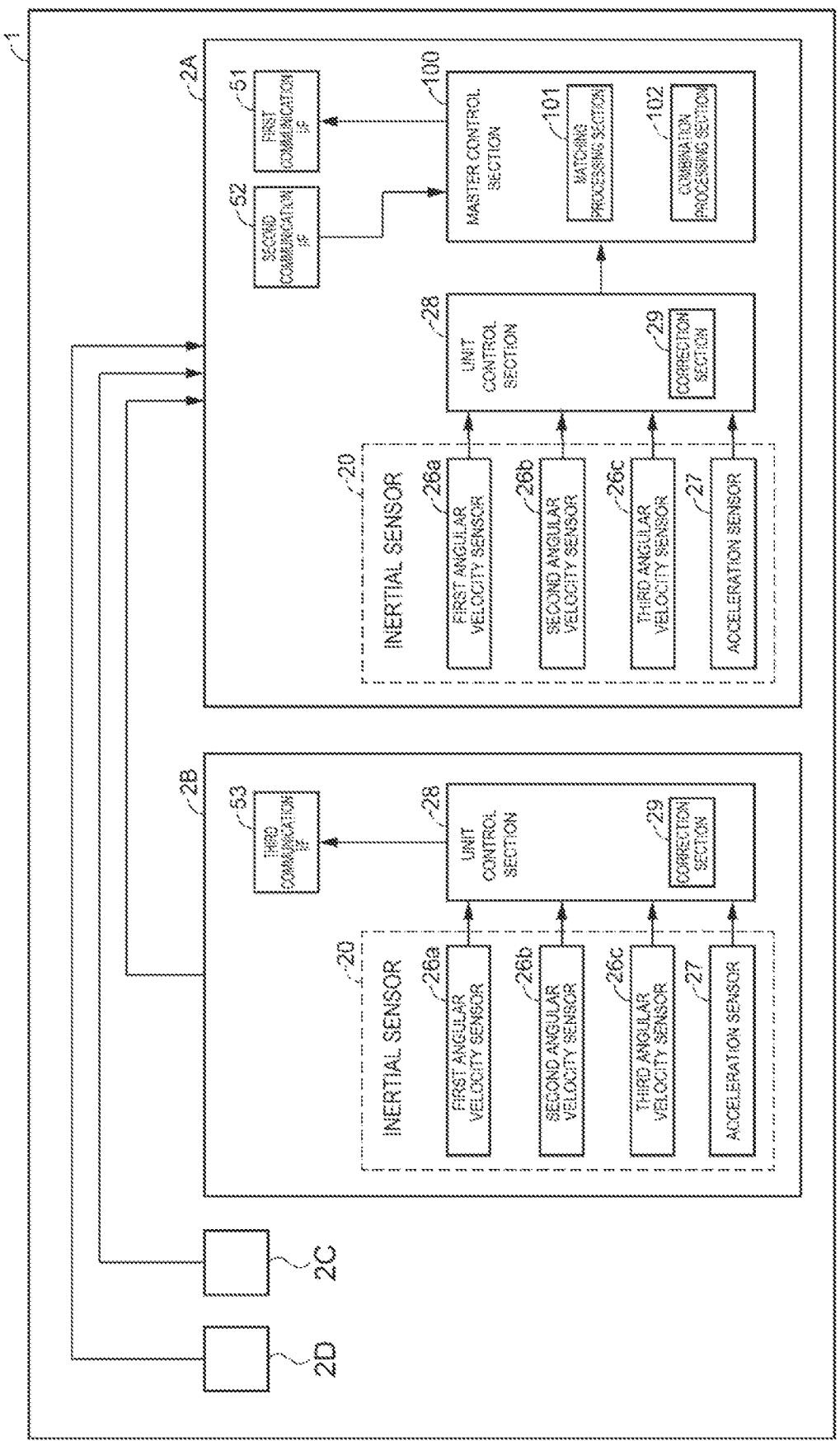
FIG. 9 is a block diagram of the inertial sensor device according to Embodiment 1.

As shown in FIG. 9, the first inertial measurement unit 2A and the second inertial measurement unit 2B are coupled to each other in the Point-to-Point. Similarly, the first inertial measurement unit 2A is coupled to each of the third inertial measurement unit 2C and the fourth inertial measurement unit 2D in the Point-to-Point. In other words, the second inertial measurement unit 2B, the third inertial measurement unit 2C, and the fourth inertial measurement unit 2D are coupled to the first inertial measurement unit 2A via respective communication lines different from each other forming the star type wiring centering on the first inertial measurement unit 2A.

By coupling the inertial measurement units with the star type wiring centering on the first inertial measurement unit 2A as described above, the first inertial measurement unit 2A operates as a master which controls the second inertial measurement unit 2B, the third inertial measurement unit 2C, and the fourth inertial measurement unit 2D, and the second inertial measurement unit 2B, the third inertial measurement unit 2C, and the fourth inertial measurement unit 2D each operate as a slave which is controlled by the first inertial measurement unit 2A. It should be noted that it does not matter what method is used as the communication method between the first inertial measurement unit 2A and the second inertial measurement unit 2B, the third inertial measurement unit 2C, and the fourth inertial measurement unit 2D such as serial communication such as SPI (Serial Peripheral Interface) or CAN (Controller Area Network).

By coupling the inertial measurement units with the star type wiring centering on the first inertial measurement unit 2A, it is possible for each of the second inertial measurement unit 2B, the third inertial measurement unit 2C, and the fourth inertial measurement unit 2D to communicate with the first inertial measurement unit 2A at high speed.

First, an operation of the first inertial measurement unit 2A will be described. The first inertial measurement unit 2A is provided with an inertial sensor 20 including at least any of the first angular velocity sensor 26a, the second angular velocity sensor 26b, the third angular velocity sensor 26c, and the acceleration sensor 27, the unit control section 28, the master control section 100, a first communication interface (I/F) 51, a second communication I/F 52. The first communication I/F 51 is electrically coupled to the first unit connector 25a, and the second communication I/F 52 is electrically coupled to the second unit connector 25b.

The inertial sensor 20 outputs a signal related to a plurality of detection axes to the unit control section 28. The unit control section 28 has a correction section 29. The correction section 29 corrects the signal output from the inertial sensor 20 so that the plurality of detection axes becomes perpendicular to each other. Besides the above, the correction section 29 corrects an offset error and a scale factor error included in the signal output from the inertial sensor 20 to the unit control section 28. It should be noted that a variety of parameters and so on to be used for the correction in the correction section 29 are stored in a storage section not shown of the unit control section 28.

The correction section 29 corrects the signal output from the inertial sensor 20 to the unit control section 28 to generate data of the first inertial measurement unit 2A. The unit control section 28 outputs the data of the first inertial measurement unit 2A generated by the correction section 29 to the master control section 100. It should be noted that the correction section 29 can be omitted. When omitting the correction section 29, the signal output from the inertial sensor 20 is output to the master control section 100 as the data of the first inertial measurement unit 2A.

To the master control section 100, there are input data of the second inertial measurement unit 2B, the third inertial measurement unit 2C, and the fourth inertial measurement unit 2D described later via the second communication I/F 52 besides the data of the first inertial measurement unit 2A. In other words, the second communication I/F 52 is a reception section for receiving data of the other inertial measurement unit than the first inertial measurement unit 2A.

The master control section 100 has a matching processing section 101 and a combination processing section 102.

The matching processing section 101 corrects misalignment as an angular error in the detection axis due to a displacement in assembling each of the inertial measurement units. Specifically, the matching processing section 101 applies predetermined correction coefficients such as a rotation matrix to the data of each of the first inertial measurement unit 2A, the second inertial measurement unit 2B, the third inertial measurement unit 2C, and the fourth inertial measurement unit 2D to thereby rotate the detection axes of each of the inertial measurement units so as to match the common reference axes to correct the data of each of the inertial measurement units.

Here, the reference axes mean an orthogonal coordinate system set in advance to every inertial sensor device 1. Further, matching the common reference axes can be satisfied by, for example, matching the detection axes of all of the inertial measurement units with the detection axes of one of the first inertial measurement unit 2A, the second inertial measurement unit 2B, the third inertial measurement unit 2C, and the fourth inertial measurement unit 2D, or can also be satisfied by matching the detection axes with the three axes, namely the X axis, the Y axis, and the Z axis, set to the substrate 10.

It should be noted that the correction coefficients and so on to be used for the correction in the matching processing section 101 are stored in a storage section not shown of the master control section 100. As the correction coefficients, it is possible to apply any one species of the rotation matrix, an Eular angle, and a quaternion.

The data of each of the first inertial measurement unit 2A, the second inertial measurement unit 2B, the third inertial measurement unit 2C, and the fourth inertial measurement unit 2D is corrected in the matching processing section 101, and the result is output from the matching processing section 101 to the combination processing section 102. The combination processing section 102 combines the data of the respective inertial measurement units corrected in the matching processing section 101, and then outputs the result as the inertial data of the inertial sensor device 1. The combination of the data in the combination processing section 102 means, for example, adding the data of the respective inertial measurement units corrected in the matching processing section 101 to each other, and then calculating an average of the data.

It should be noted that the present embodiment includes the matching processing section 101, but the matching processing section 101 can be omitted. The data of the first inertial measurement unit 2A, the second inertial measurement unit 2B, the third inertial measurement unit 2C, and the fourth inertial measurement unit 2D are combined by the combination processing section 102, and the result is output.

The inertial data which is obtained by combining the data of the respective inertial measurement units with each other, and which is output by the combination processing section 102 is output from the master control section 100 to the first communication I/F 51. The inertial data output to the first communication I/F 51 is output to an external device via the first unit connector 25a. In other words, the first communication interface I/F 51 is a first transmission section for transmitting the inertial data output by the combination processing section 102.

Then, operations of the second inertial measurement unit 2B, the third inertial measurement unit 2C, and the fourth inertial measurement unit 2D will be described. Since the second inertial measurement unit 2B, the third inertial measurement unit 2C, and the fourth inertial measurement unit 2D are substantially the same in configuration, the description will be presented illustrating the second inertial measurement unit 2B, and the description of the third inertial measurement unit 2C and the fourth inertial measurement unit 2D will be omitted.

The second inertial measurement unit 2B has the inertial sensor 20, the unit control section 28, and a third communication I/F 53. The third communication I/F 53 is coupled to the third unit connector 25c. The inertial sensor 20 outputs a signal related to a plurality of detection axes to the unit control section 28. The unit control section 28 has a correction section 29.

In the second inertial measurement unit 2B, the unit control section 28 outputs the data of the second inertial measurement unit 2B generated by the correction section 29 to the third communication I/F 53. The data of the second inertial measurement unit 2B output to the third communication I/F 53 is output to the second unit connector 25b of the first inertial measurement unit 2A via the third unit connector 25c and the interconnections not shown and provided to the substrate 10. In other words, the third communication I/F 53 is a second transmission section for transmitting the data of the second inertial measurement unit 2B to the first inertial measurement unit 2A.

As described hereinabove, according to the present embodiment, the following advantages can be obtained.

Since the first inertial measurement unit 2A has the combination processing section 102 for combining the data of the first inertial measurement unit 2A and the data of the second inertial measurement unit 2B, the third inertial measurement unit 2C, and the fourth inertial measurement unit 2D received by the first inertial measurement unit 2A with each other, there is no need to dispose a dedicated substrate for the combination processing section 102 or the master control section 100 including the combination processing section 102 separately from the inertial measurement units. Therefore, the arrangement efficiency of the inertial measurement units is enhanced, and it is possible to reduce the size of the inertial sensor device 1. Further, since it is also possible to appropriately correct the data of the inertial sensor 20 of each of the inertial measurement unit before being combined by the combination processing section 102, it is possible to obtain the high-precision inertial sensor device 1.

Further, according to the present embodiment, it is possible to obtain the first inertial measurement unit 2A which makes a contribution to reduction in size and an increase in accuracy of the inertial sensor device 1.

2. Embodiment 2

Then, an inertial sensor device 1a according to Embodiment 2 will be described with reference to FIG. 10. It should be noted that in the following description, the differences from the Embodiment 1 described above are mainly described, and regarding the configuration the same as in Embodiment 1, the same reference symbols are attached, and redundant descriptions will be omitted. Further, since the internal configurations of the third inertial measurement unit 2C and the fourth inertial measurement unit 2D are the same as the internal configuration of the second inertial measurement unit 2B, the illustration of the internal configurations of the third inertial measurement unit 2C and the fourth inertial measurement unit 2D is omitted in FIG. 10.

In Embodiment 2, similarly to Embodiment 1, the first inertial measurement unit 2A operates as a master which controls the other inertial measurement units than the first inertial measurement unit 2A such as the second inertial measurement unit 2B, and the other inertial measurement units than the first inertial measurement unit 2A operate as slaves which are controlled by the first inertial measurement unit 2A. It should be noted that Embodiment 2 is different in coupling configuration between the first inertial measurement unit 2A and the other inertial measurement units than the first inertial measurement unit 2A from Embodiment 1.

Figure 10:
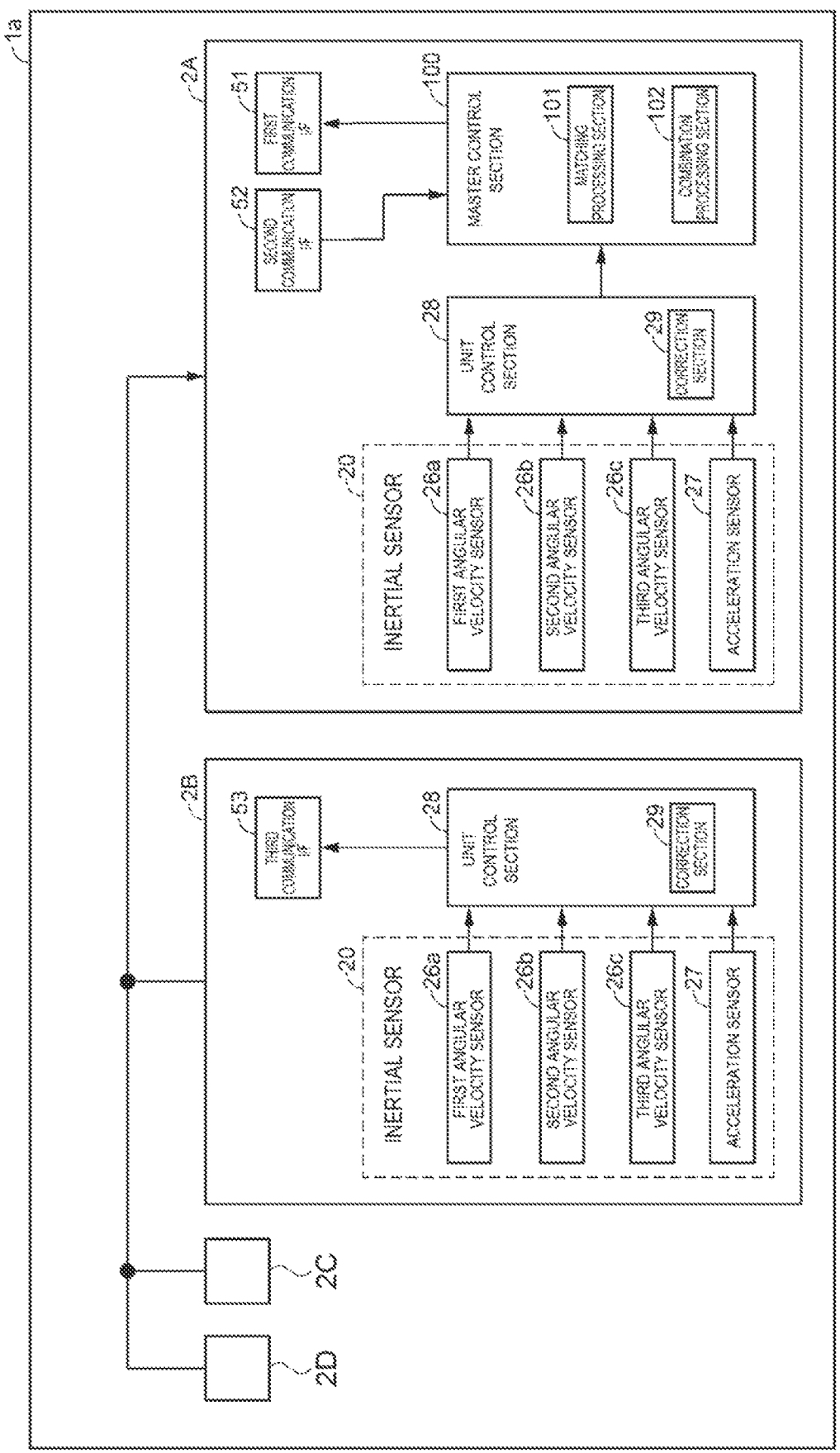
FIG. 10 is a block diagram of an inertial sensor device according to Embodiment 2.

As shown in FIG. 10, in the inertial sensor device 1a, the first inertial measurement unit 2A, the second inertial measurement unit 2B, the third inertial measurement unit 2C, and the fourth inertial measurement unit 2D are coupled to each other with a communication line common thereto. In other words, the first inertial measurement unit 2A, the second inertial measurement unit 2B, the third inertial measurement unit 2C, and the fourth inertial measurement unit 2D are coupled to each other with the bus type wiring.

According to the present embodiment, the following advantages can be obtained in addition to the advantages in Embodiment 1.

By coupling the first inertial measurement unit 2A, the second inertial measurement unit 2B, the third inertial measurement unit 2C, and the fourth inertial measurement unit 2D to each other with the bus type wiring, it is possible to easily add the second inertial measurement unit 2B and so on which function as the slave while simplifying the configuration of the second communication I/F 52 of the first inertial measurement unit 2A which functions as the master.

3. Embodiment 3

Then, an inertial sensor device 1b according to Embodiment 3 will be described with reference to FIG. 11. It should be noted that in the following description, the differences from the Embodiment 1 described above are mainly described, and regarding the configuration the same as in Embodiment 1, the same reference symbols are attached, and redundant descriptions will be omitted. Further, since internal configurations and operations of a third inertial measurement unit 2Cb and a fourth inertial measurement unit 2Db are the same as an internal configuration and an operation of a second inertial measurement unit 2Bb, illustration of the internal configurations of the third inertial measurement unit 2Cb and the fourth inertial measurement unit 2Db is omitted in FIG. 11.

In Embodiment 3, similarly to Embodiment 1, a first inertial measurement unit 2Ab operates as a master which controls the other inertial measurement units than the first inertial measurement unit 2Ab such as the second inertial measurement unit 2Bb, and the other inertial measurement units than the first inertial measurement unit 2Ab operate as slaves which are controlled by the first inertial measurement unit 2Ab. It should be noted that the internal configurations and the operations of the first inertial measurement unit 2Ab, the second inertial measurement unit 2Bb, the third inertial measurement unit 2Cb, and the fourth inertial measurement unit 2Db are different from those in Embodiment 1.

Figure 11:
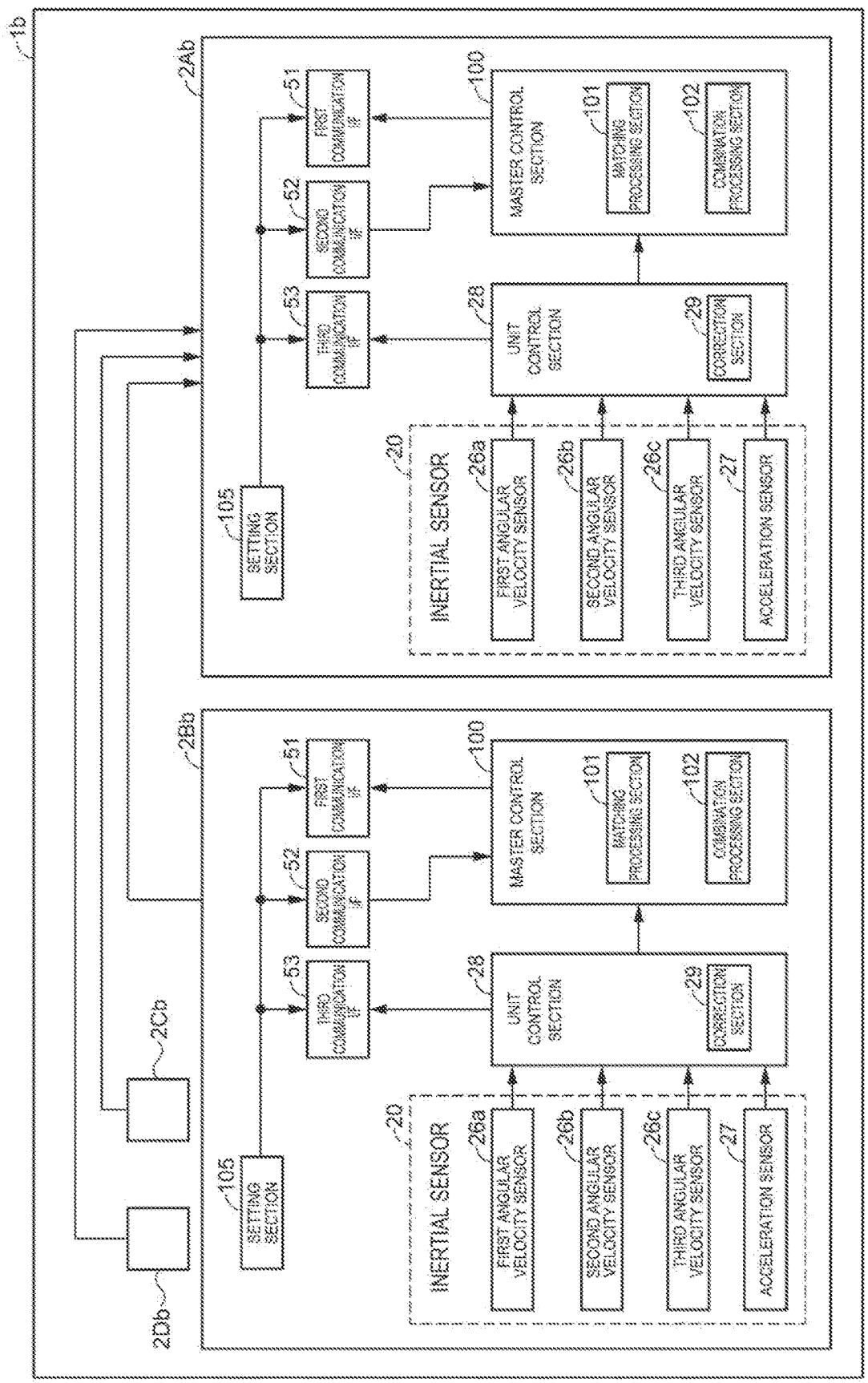
FIG. 11 is a block diagram of an inertial sensor device according to Embodiment 3.

As shown in FIG. 11, the internal configuration is common to the first inertial measurement unit 2Ab, the second inertial measurement unit 2Bb, the third inertial measurement unit 2Cb, and the fourth inertial measurement unit 2Db, and each of the inertial measurement units has the inertial sensor 20, the unit control section 28, the master control section 100, the first communication I/F 51, the second communication I/F 52, the third communication I/F 53, and a setting section 105.

The setting section 105 is, for example, an MCU (Micro Controller Unit), and controls the first communication I/F 51, the second communication I/F 52, and the third communication I/F 53. The setting section 105 has a storage section not shown for storing identifiers. The identifiers represent whether each of the first inertial measurement unit 2Ab, the second inertial measurement unit 2Bb, the third inertial measurement unit 2Cb, and the fourth inertial measurement unit 2Db is the master or the slave.

In the present embodiment, for example, the identifier equal to 0 represents the master, and the identifier equal to an integer other than 0 represents the slave. Specifically, the identifier for the first inertial measurement unit 2Ab as the master is equal to 0, the identifier for the second inertial measurement unit 2Bb as the slave is equal to 1, and similarly, the identifiers for the third inertial measurement unit 2Cb and the fourth inertial measurement unit 2Db have the values of 2 and 3, respectively. It should be noted that it is preferable for the identifiers for the first inertial measurement unit 2Ab, the second inertial measurement unit 2Bb, the third inertial measurement unit 2Cb, and the fourth inertial measurement unit 2Db to be different in value from each other.

The setting section 105 controls the first communication I/F 51, the second communication I/F 52, and the third communication I/F 53 in accordance with the identifier.

First, the first inertial measurement unit 2Ab as the master is illustrated to describe the operation of the setting section 105. The setting section 105 of the first inertial measurement unit 2Ab determines whether the identifier for the first inertial measurement unit 2Ab is 0 representing the master or an integer other than 0 representing the slave. When the setting section 105 has determined that the identifier for the first inertial measurement unit 2Ab is 0, namely the identifier representing the master, the setting section 105 sets the first communication I/F 51 and the second communication I/F 52 enabled, and sets the third communication I/F 53 disabled so that the first inertial measurement unit 2Ab operates as the master of the other inertial measurement units than the first inertial measurement unit 2Ab. In other words, the second communication I/F 52 becomes the reception section for receiving the data of the other inertial measurement units than the first inertial measurement unit 2Ab, and the first communication I/F 51 becomes the first transmission section for transmitting the inertial data output by the combination processing section 102.

Then, the second inertial measurement unit 2Bb as the slave is illustrated to describe the operation of the setting section 105. The setting section 105 of the second inertial measurement unit 2Bb discriminates the identifier for the second inertial measurement unit 2Bb. When the setting section 105 has determined that the identifier for the second inertial measurement unit 2Bb is 1, namely the identifier representing the slave, the setting section 105 sets the first communication I/F 51 and the second communication I/F 52 disabled, and sets the third communication I/F 53 enabled so that the second inertial measurement unit 2Bb operates as the slave of the first inertial measurement unit 2Ab. In other words, the third communication I/F 53 becomes the second transmission section for transmitting the data of the second inertial measurement unit 2Bb to the first inertial measurement unit 2Ab.

Similarly to the second inertial measurement unit 2Bb, the setting sections 105 of the third inertial measurement unit 2Cb and the fourth inertial measurement unit 2Db discriminate the identifiers for the third inertial measurement unit 2Cb and the fourth inertial measurement unit 2Db, and set the communication I/F of the third inertial measurement unit 2Cb and the fourth inertial measurement unit 2Db so that the third inertial measurement unit 2Cb and the fourth inertial measurement unit 2Db operate as the slaves of the first inertial measurement unit 2Ab.

It should be noted that although in the present embodiment, the setting section 105 controls the first communication I/F 51, the second communication I/F 52, and the third communication I/F 53 in accordance with the identifier, it is also possible for the setting section 105 to set either one of the first communication I/F 51 and the third communication I/F 53 enabled in accordance with the identifier. Specifically, it is possible for the setting section 105 to perform substantially the same operation as in Embodiment 1 only by setting the second communication I/F 52 enable irrespective of the identifier, setting the first communication I/F 51 enable and setting the third communication I/F 53 disabled when the identifier represents the master, and setting the first communication I/F 51 disabled and setting the third communication I/F 53 enabled when the identifier represents the slave.

Further, although in the present embodiment, it is assumed that the first communication I/F 51, the second communication I/F 52, and the third communication I/F 53 are hardware units separated from each other, it is possible to use the same transmitting hardware unit for the first communication I/F 51 and the third communication I/F 53. When the first communication I/F 51 and the third communication I/F 53 use the same transmitting hardware unit, the setting section 105 performs an operation of switching the data to be transmitted by the transmitting hardware unit and the destination in accordance with the identifier. Specifically, when the identifier represents the master, the setting section 105 switches the transmitting hardware unit to become the first transmission section transmitting for inertial data output by the combination processing section 102 to the external device, and when the identifier represents the slave, the setting section 105 switches the transmitting hardware unit to become the second transmission section for transmitting the data of the other inertial measurement units than the first inertial measurement unit 2Ab to the first inertial measurement unit 2Ab.

Further, although in the present embodiment, the setting section 105 is disposed independently of the unit control section 28, it is possible to adopt a configuration in which the unit control section 28 includes the setting section 105.

Further, although the description is presented assuming that the identifiers inherent in the respective inertial measurement units are stored in advance in the storage section not shown of the respective setting sections 105 of the first inertial measurement unit 2Ab, the second inertial measurement unit 2Bb, the third inertial measurement unit 2Cb, and the fourth inertial measurement unit 2Db in the present embodiment, writing of the identifiers into the storage sections not shown of the setting sections 105 of the respective inertial measurement units can be performed when manufacturing the inertial measurement units or the inertial sensor device 1*b*, or can be performed from an external device after the inertial sensor device 1*b* is installed.

According to the present embodiment, the following advantages can be obtained in addition to the advantages in Embodiment 1.

By providing the common internal configuration to the first inertial measurement unit 2Ab, the second inertial measurement unit 2Bb, the third inertial measurement unit 2Cb, and the fourth inertial measurement unit 2Db, there is no need to manufacture the inertial measurement unit dedicated to the master and the inertial measurement unit dedicated to the slave different in internal configuration separately from each other, and therefore, it is possible to obtain the inertial sensor device 1*b* low in cost. Further, when a failure occurs in any of the inertial measurement units, it is possible to easily replace the inertial measurement unit in which the failure occurs, and therefore, it is possible to obtain the inertial sensor device 1*b* excellent in maintainability.

Further, according to the present embodiment, it is possible to obtain the first inertial measurement unit 2Ab which makes a contribution to reduction in cost of the inertial sensor device 1*b* in addition to the advantages in Embodiment 1.

It should be noted that the inertial sensor device 1, 1*a*, and 1*b* and the first inertial measurement unit 2A, 2Ab can be applied to a vehicle such as a car, a robot, or a drone, an electronic apparatus such as a smartphone or a head mounted display, and so on.

What is claimed is:

1. An inertial sensor device comprising:
 a plurality of inertial measurement units, wherein
 one of the inertial measurement units includes
   an inertial sensor,
   a reception section configured to receive data of another of the inertial measurement units,
   a combination processing section configured to operate the data of the another of the inertial measurement units and data of the one of the inertial measurement units,
   a first transmission section configured to transmit output of the combination processing section,
   a second transmission section configured to transmit the data of the one of the inertial measurement units, and a setting section configured to enable and disable transmission of one of the first transmission section and the second transmission section.

2. The inertial sensor device according to claim 1, wherein the one of the inertial measurement units and the another of the inertial measurement units are coupled to each other with star type wiring.

3. The inertial sensor device according to claim 1, wherein the one of the inertial measurement units and the another of the inertial measurement units are coupled to each other with bus type wiring.

4. An inertial measurement unit to be used in an inertial sensor device having a plurality of inertial measurement units, comprising:
   an inertial sensor;
   a reception section configured to receive data of another of the inertial measurement units;
   a combination processing section configured to operate the data of the another of the inertial measurement units and data of the inertial measurement unit;
   a first transmission section configured to transmit output of the combination processing section,
   a second transmission section configured to transmit the data of the inertial measurement unit; and
   a setting section configured to enable and disable transmission of one of the first transmission section and the second transmission section.

* * * * *